Figure 1:
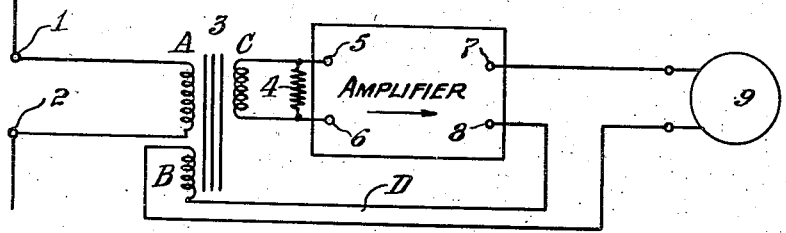

Sept. 19, 1944.    H. SKILLING    2,358,480
CURRENT MEASURING DEVICE
Filed Feb. 12, 1942

INVENTOR
Hugh Skilling
BY
ATTORNEY

Patented Sept. 19, 1944

2,358,480

UNITED STATES PATENT OFFICE 2,358,480

CURRENT MEASURING DEVICE

Hugh Skilling, Stanford University, Calif., assignor to International Standard Electric Corporation, New York, N. Y., a corporation of Delaware Application February 12, 1942, Serial No. 430,654

1 Claim. (Cl. 171—95)

This invention relates to new and useful improvements in current measuring arrangements.

The object of the invention is an arrangement suitable for measuring current with good accuracy and with a minimum of disturbance to the circuit in which current is measured.

In accordance with the present invention a device is connected to a circuit in which a current is flowing, in order to provide for measuring or other purposes, a current that is proportional in amplitude and similar in phase and wave-form to the current flowing in said circuit. The operation of the device is such that it will draw a minimum amount of power from the circuit and cause negligible change in the behaviour of that circuit, while providing as much power as may be necessary to operate measuring instruments or other apparatus in its output circuit.

The device comprises an amplifier that is stabilized with negative feed-back. The output current of the amplifier is fed back to the input circuit in such a way that the output current will be almost exactly equal to the current being measured, regardless of a reasonable amount of non-linearity or variability of characteristics of the amplifier, or, if preferred, a transformer may be used in such a way that the output current will be related to the current being measured by a constant factor that likewise is independent of the amplifier characteristics.

In accordance with one of the features of the invention the output current of the amplifier is balanced against the input current to be measured in such a way that the voltage drop produced in the circuit in which the measurement is made is reduced to a minimum. At the same time the advantages of high stability and low distortion inherent in negative feed-back circuits are obtained.

The invention will now be more fully explained with the aid of the drawing in which Figs. 1–5 diagrammatically illustrate five embodiments of the present invention, only so much being shown as is necessary for a clear understanding. Obviously, many other variants are possible.

In the arrangement shown in Fig. 1, input terminals 1, 2 are connected in the circuit that is carrying the current to be measured, the current I. The current I flows through one winding A of an iron core transformer 3. The output of transformer 3 from winding C, goes to a resistance 4 at the input terminals 5 and 6 of an amplifier. The output terminals 7 and 8 of the amplifier are connected to actuate an ammeter 9 or for any other desired purpose. The output current of the amplifier is also carried by a third winding B, on the transformer 3 connected in series with 9 over feed-back path D. Winding B is similar to winding A as regards arrangement of turns and position on the transformer core, except that it may have a different number of turns. The phase relations of the transformer and of the amplifier are designed so that the magnetomotive force produced in the transformer core by current in winding B will be in a direction opposed to the magnetomotive force produced by the current in winding A.

The operation of the device is as follows: Current I will flow in winding A. It will induce voltage in winding C. Current will flow through the resistance 4 at the amplifier input terminals, applying voltage to the amplifier. Assuming the amplifier to be ideal in its operation, current will flow in the amplifier output circuit that is proportional in amplitude and similar in phase and wave-form to the amplifier input voltage and hence to the current I.

The winding B serves two purposes: First, it provides stability for the amplifier, and fidelity of reproduction of the input current. The magnetomotive force produced by current in winding B is opposed to that produced by current in winding A, and may approach it in magnitude, but can never quite equal it, for if it did there would be no flux in the transformer and hence no voltage applied to the amplifier input terminals. If the amplification of the amplifier is quite large, the magnetomotive force of winding B will be only very slightly less than that of winding A, and there will be only a small amount of flux in the transformer, proportional to the difference of magnetomotive forces. Current in winding B will be related to current in winding A by the turn-ratio of the transformer. Stability and fidelity result from the fact that non-linearity or phase shift in the amplifier, or a considerable change in the amplifier characteristics, will have negligible effect on the output current of the amplifier because the magnetomotive force produced in the transformer by the output current can never differ by more than a very small amount from the magnetomotive force produced by the current I.

Second, the operation of the winding B is such that the measuring device introduces only a very small voltage drop into the circuit in which current I is flowing. Since the magnetomotive force of current in winding B opposes the magnetomotive force of current in winding A, the amount of flux in the core of the transformer is quite small. Voltage induced in winding A is therefore correspondingly small, and if the resistance of winding A is low the main circuit will be very little affected by introduction of the measuring device. With proper design, a negligible amount of power is taken from the circuit carrying current I. The turn-ratios among the three windings of the transformer are so adjusted that the applied voltage between terminals 5, 6 will be greater than the drop between 1 and 2.

The customary current measuring device of the prior art employing amplification stabilized with negative feed-back passes the current to be measured through a resistive shunt and measures the voltage drop across that shunt. Part of the amplifier output is balanced against the input voltage in the stabilizing feed-back circuit. The voltage drop across the resistive shunt is greater than the voltage at the grid of the first amplifier tube by the same factor as that providing stability by negative feed-back. It has been suggested, for instance, in the measurement of current in a network analyzer to use a shunt in the main circuit to provide 10 millivolts drop and then, using a feed-back of ten to one, apply only 1 millivolt to the first stage of the amplifier. But there is still a drop of 10 millivolts in the circuit in which current is measured.

The present improved arrangement balances a current from the output circuit against the main current to be measured, by balancing magnetomotive forces in transformer 3. The differential current, or the differential magnetomotive force, then produces a voltage that is applied to the first stage of the amplifier. Hence the voltage drop in the main circuit is no greater than the voltage applied to the grid of the first amplifier tube. Applied to a network analyzer, the disturbance in the main analyzer network resulting from use of the measuring device would be reduced to one-tenth by use of the present invention, all other factors remaining the same. With 1 millivolt applied to the grid of the first tube of the amplifier, the drop in the main circuit would also be 1 millivolt. The feed-back factor of ten to one is relatively small, and if it were increased the advantage of the new measuring circuit would be increased in proportion.

The present invention makes thus possible either to produce a smaller disturbance in the main circuit, using a given amplifier; or to allow the same disturbance of the main circuit and use a smaller amplifier.

Many modifications of the circuit shown in Fig. 1 are possible without altering the essential principle of operation. Additional transformers, shunts, or other impedances can be connected across the terminals of windings A, B, or C, or the output terminals. For example, it is possible to use a shunt 10 across the input terminals, as in Fig. 2, either with or without the resistance 4.

Figure 3:
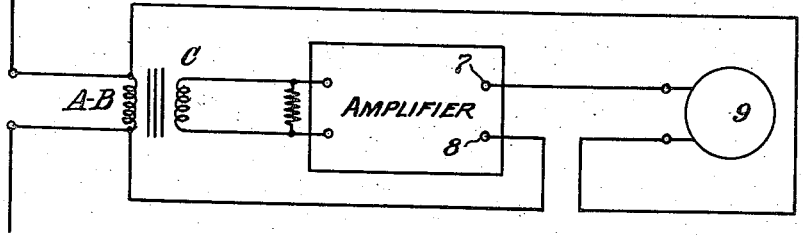

Windings A and B can be combined, as in Fig. 3. One winding may be part of the other, as in an auto-transformer, or the two may coincide as shown. The feed-back path extends from meter 9 to one end of winding A—B and from amplifier terminal 8 to the other end of the winding. Loss of flexibility of design results.

The resistance across winding C may be eliminated if the amplifier is appropriately designed.

Figure 4:
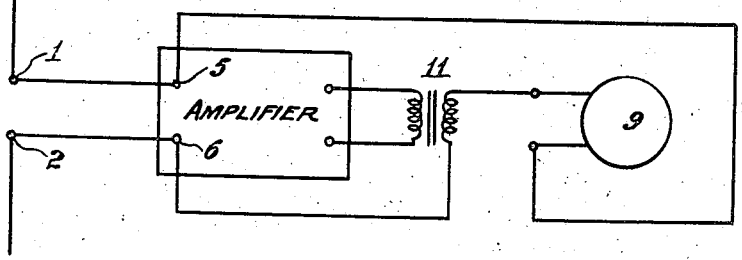

The input transformer may be eliminated entirely, as in Fig. 4. The input terminals are connected direct with terminals 5 and 6. An output transformer 11 may be connected with the output terminals of the amplifier. The feed-back path extends from the secondary winding of transformer 11 and an output terminal of meter 9 to the input terminals 5 and 6 of the amplifier. Further flexibility of design is lost by this arrangement.

The apparatus connected to the output of the current measuring device 9 may be another amplifier. By this meanes flexibility of design may be gained.

Figure 5:
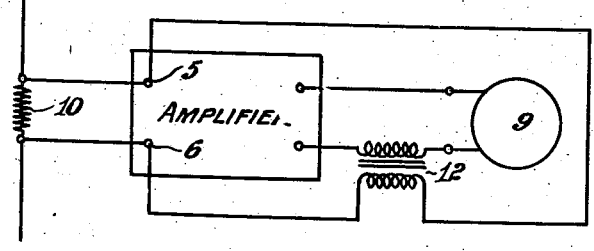

A transformer 12 may be used to supply the feed-back circuit as shown in Fig. 5, either with or without the input shunt 10 that is shown in that figure. The feed-back path includes the secondary of transformer 12 and the input terminals of the amplifier.

The amplifier and the feed-back network must be designed according to principles that are generally known by those familiar with the art. Self-oscillation must be avoided.

By proper choice of turn-ratios on the input transformer 3 of Fig. 1 the magnitude of current in the output circuit may be made to bear any desired relation to the input current. It may be either larger or smaller. A large number of turns in winding C is usually desirable to produce a voltage at the input terminals of the amplifier that is as large as possible compared to the voltage drop in the main circuit.

Figure 2:
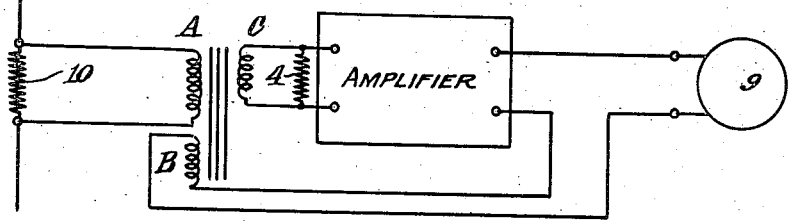

The circuits shown in Figs. 1 and 2 have given good results, i. e., a high degree of stability without oscillations. Other alternatives and modifications coming within the scope of the appended claim, however, will occur to those versed in the art.

What I claim is:

An arrangement for measuring accurately the current flowing in a circuit with a minimum of disturbance to the circuit in which the current is measured, which comprises an iron core transformer, a first primary winding therefore connected in series with said circuit forming the sole connection between said circuit and said measuring arrangement, an amplifier having input and output terminals, a secondary winding for said transformer connected across the input terminals of said amplifier, a meter having one terminal connected to an output terminal of said amplifier, a second primary winding for said transformer connected between a second terminal of said meter and another output terminal of said amplifier, the characteristics for the second primary circuit being such that the current flowing therethrough is almost equal in effect to that flowing through the first primary winding but opposite in direction, whereby the voltage drop across the first primary winding is kept at a minimum value.

HUGH SKILLING.